US011297687B2

(12) United States Patent
Hayashi et al.

(10) Patent No.: US 11,297,687 B2
(45) Date of Patent: Apr. 5, 2022

(54) INFORMATION PROCESSING DEVICE, INFORMATION PROCESSING SYSTEM, AND INFORMATION PROCESSING METHOD

(71) Applicant: SONY CORPORATION, Tokyo (JP)

(72) Inventors: Kazunori Hayashi, Tokyo (JP); Junji Kato, Tokyo (JP); Tomoaki Matsumura, Tokyo (JP); Osamu Yoshimura, Kanagawa (JP); Kensaku Wakuda, Kanagawa (JP); Tomoya Oikawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 161 days.

(21) Appl. No.: 16/093,782

(22) PCT Filed: Jan. 26, 2017

(86) PCT No.: PCT/JP2017/002644
§ 371 (c)(1),
(2) Date: Oct. 15, 2018

(87) PCT Pub. No.: WO2017/183244
PCT Pub. Date: Oct. 26, 2017

(65) Prior Publication Data
US 2019/0090307 A1    Mar. 21, 2019

(30) Foreign Application Priority Data
Apr. 19, 2016    (JP) .................................. 2016-083491

(51) Int. Cl.
*H04W 56/00*    (2009.01)
*H04W 88/04*    (2009.01)
(Continued)

(52) U.S. Cl.
CPC ............... *H04W 88/04* (2013.01); *H04L 1/00* (2013.01); *H04L 1/1809* (2013.01); *H04L 29/04* (2013.01);
(Continued)

(58) Field of Classification Search
CPC ..... H04W 88/04; H04W 76/15; H04W 40/22; H04W 72/02; H04W 72/085;
(Continued)

(56) References Cited

U.S. PATENT DOCUMENTS

2002/0080719 A1\* 6/2002 Parkvall ................ H04L 1/1825
370/235
2006/0246953 A1\* 11/2006 Yamamoto ........... H04B 17/318
455/562.1
(Continued)

FOREIGN PATENT DOCUMENTS

JP    H09-55776 A    2/1997
JP    H10-178422 A    6/1998
(Continued)

OTHER PUBLICATIONS

Extended European Search Report dated Mar. 13, 2019, issued in corresponding European Application No. 17785589.7, 10 pages.
(Continued)

*Primary Examiner* — Sai Ming Chan
(74) *Attorney, Agent, or Firm* — Xsensus LLP (57) ABSTRACT

To prevent a decrease in transmission rate of an entirety of a system including devices that transmit data items with use of a plurality of channels ever, in a case where some of the channels change in condition, for example, decrease in transmission rate.
In an information processing device including channel evaluation units, a channel selection unit, and a transmission control unit, the channel evaluation units evaluate, on the
(Continued)

basis of an evaluation function, a plurality of channels that transmit data items via wireless communication. The channel selection unit performs selection from the plurality of channels on the basis of results of the evaluations. The transmission control unit transmits the data items to the plurality of channels subjected to the selection.

9 Claims, 7 Drawing Sheets

(51) Int. Cl.
| | |
|---|---|
| H04W 76/15 | (2018.01) |
| H04L 69/14 | (2022.01) |
| H04W 88/06 | (2009.01) |
| H04L 1/18 | (2006.01) |
| H04L 1/00 | (2006.01) |
| H04W 72/02 | (2009.01) |
| H04W 40/22 | (2009.01) |
| H04W 72/08 | (2009.01) |
| H04B 17/309 | (2015.01) |

(52) U.S. Cl.
CPC ............ *H04L 69/14* (2013.01); *H04W 40/22* (2013.01); *H04W 72/02* (2013.01); *H04W 72/085* (2013.01); *H04W 76/15* (2018.02); *H04W 88/06* (2013.01); *H04B 17/309* (2015.01)

(58) Field of Classification Search
CPC ........ H04W 88/06; H04L 1/00; H04L 1/1809; H04L 29/04; H04L 69/14; H04B 17/309
USPC ........................................................ 370/329
See application file for complete search history.

(56) References Cited

U.S. PATENT DOCUMENTS

| | | | | |
|---|---|---|---|---|
| 2007/0022361 | A1* | 1/2007 | Bauer ................... | H04L 1/0014 |
| | | | | 714/776 |
| 2010/0008440 | A1* | 1/2010 | Lin ....................... | H04B 7/0632 |
| | | | | 375/267 |
| 2011/0086661 | A1* | 4/2011 | Yamamoto .......... | H04W 72/085 |
| | | | | 455/513 |
| 2011/0122854 | A1* | 5/2011 | De Lind Van Wijngaarden ......... |  |
| | | | | H04L 12/5692 |
| | | | | 370/338 |
| 2011/0292921 | A1* | 12/2011 | Hunter .................... | H04L 45/74 |
| | | | | 370/338 |
| 2014/0012961 | A1* | 1/2014 | Pope ....................... | H04L 69/40 |
| | | | | 709/220 |
| 2014/0086211 | A1* | 3/2014 | Liu ......................... | H04L 45/38 |
| | | | | 370/331 |
| 2016/0316354 | A1 | 10/2016 | Matsumura et al. | |

FOREIGN PATENT DOCUMENTS

| | | |
|---|---|---|
| JP | 2001-28614 A | 1/2001 |
| JP | 2013-512618 A | 4/2013 |
| JP | 2013214808 A | 10/2013 |
| WO | 2010/033919 A2 | 3/2010 |
| WO | 2015/098666 A1 | 7/2015 |

OTHER PUBLICATIONS

English-language translation of International Search Report and Written Opinion in the International patent application No. PCT/JP2017/002644 dated Apr. 18, 2017.

Communication pursuant to Article 94(3) EPC issued in European Application 17 785 589.7-1213 dated Oct. 17, 2019.

* cited by examiner

INFORMATION PROCESSING DEVICE, INFORMATION PROCESSING SYSTEM, AND INFORMATION PROCESSING METHOD

TECHNICAL FIELD

The present technology relates to an information processing device, an information processing system, and an information processing method. More specifically, the present technology relates to an information processing device, an information processing system, and an information processing method in which information items are exchanged by utilizing wireless communication.

BACKGROUND ART

Hitherto, LTE (Long Term Evolution) has been used as a system that establishes connection to networks such as the Internet with use of wireless communication. This LTE enables high-speed transmission of data items, and hence systems that transmit and receive a large number of data items such as those of moving images via the LTE have been used. For example, a system that transfers data items by using devices that use the LTE, such as a smartphone, as relay devices has been proposed (refer, for example, to Patent Literature 1.). In this system, another terminal around a hub terminal that transmits and receives data items is searched for, and the other terminal found by the search is used as a relay terminal. When a plurality of terminals are selected as this relay terminal, the data items are allocated to channels of the selected terminals. With this, the data items are transmitted via the plurality of channels.

CITATION LIST

Patent Literature

Patent Literature 1: International Publication No. WO 2015/098666

DISCLOSURE OF INVENTION

Technical Problem

The above-described related art has a problem that, at the time when the data items allocated to the plurality of channels are transmitted, in a case where the channels change in condition, for example, some of the channels decrease in transmission rate, an entirety of the system decreases in transmission rate.

The present technology has been made in view of such circumstances, and it is an object thereof to prevent a decrease in transmission rate of an entirety of a system including devices that transmit data items with use of a plurality of channels even in a case where some of the channels change in condition, for example, decrease in transmission rate.

Solution to Problem

The present technology has been made to solve the above-described problem. According to a first aspect of the present technology, there is provided an information processing device and an information processing method, the information processing device including:

channel evaluation units that evaluate, on the basis of an evaluation function, a plurality of channels that transmit data items via wireless communication;

a channel selection unit that performs selection from the plurality of channels on the basis of results of the evaluations; and a transmission control unit that transmits the data items to the plurality of channels subjected to the selection. With this, an advantage that the plurality of channels are evaluated and selected on the basis of the evaluation function is obtained.

Further, according to the first aspect, the evaluation function on the basis of which the channel evaluation units evaluate the plurality of channels may be a function of evaluating at least one of a transmission rate or an error rate. With this, an advantage that the channels are evaluated on the basis of the at least one of the transmission rate or the error rate is obtained.

Still further, according to the first aspect, the evaluation function on the basis of which the channel evaluation units evaluate the plurality of channels may be a function of evaluating information items from an outside, with this, an advantage that the channels are evaluated on the basis of the information items from the outside is obtained.

Yet further, the information processing device according to the first aspect may further include data holding units that hold the data items. The transmission control unit may transmit the data items held by the data holding units to the channels subjected to the selection in accordance with the number of the data items held by the data holding units. With this, an advantage that the data items held by the data holding units are transmitted to the channels subjected to the selection in accordance with the number of the data items held by the data holding units is obtained.

Yet further, according to the first aspect, the channel selection unit may select one of the plurality of channels on the basis of the results of the evaluations. With this, an advantage that the one of the plurality of channels is selected is obtained.

Yet further, according to the first aspect, the channel selection unit may select a plurality of ones of the plurality of channels on the basis of the results of the evaluations, and the transmission control unit may transmit the data items to the plurality of selected ones of the plurality of channels. With this, an advantage that the data items are transmitted to the plurality of selected channels is obtained.

Yet further, according to the first aspect, in a case where missing of the transmitted data items occurs, the transmission control unit may retransmit missing ones of the data items to the channels subjected to the selection. With this, an advantage that the missing ones of the data items are retransmitted is obtained.

Further, according to a second aspect of the present technology, there is provided an information processing device including:

channel evaluation units that evaluate, on the basis of an evaluation function, a plurality of channels that transmit data items via wireless communication;

a channel selection unit that performs selection from the plurality of channels on the basis of results of the evaluations; and a reception control unit that receives the data items transmitted to the plurality of channels, and transmits, to the plurality of channels subjected to the selection, a retransmission request for missing ones of the data items in a case where missing of the received data items occurs. With this, an advantage that the retransmission request for the missing ones of the data items is transmitted is obtained.

Further, according to a third aspect of the present technology, there is provided an information processing system including:
a transmission device including
channel evaluation units that evaluate, on the basis of an evaluation function, a plurality of channels that transmit data items via wireless communication,
a channel selection unit that performs selection from the plurality of channels on the basis of results of the evaluations, and
a transmission control unit that transmits the data items to the plurality of channels subjected to the selection; and
a reception device including
a reception control unit that receives the data items transmitted via the plurality of channels. With this, the advantage that the plurality of channels are evaluated and selected on the basis of the evaluation function is obtained.

Advantageous Effects of Invention

According to the present technology, it is possible to provide a significant advantage of preventing the decrease in data transmission rate of the entirety of the system including the devices that transmit data items with use of the plurality of channels even in the case where some of the channels change in condition, for example, decrease in transmission rate. Note that, the advantages disclosed herein are not necessarily limited to those described hereinabove, and all the advantages described hereinabove and hereinbelow can be obtained.

MODE(S) FOR CARRYING OUT THE INVENTION

Now, embodiments for embodying the present technology (hereinafter, abbreviated as embodiments) are described. The description is made in the following order.

1. First Embodiment (Exemplary Case of selecting Channel with High-Transmission Rate)
2. Second Embodiment (Exemplary Case of Retransmitting Missing Data Items)
3. Third Embodiment (Exemplary Case of Transmitting Audio Data Items)

1. First Embodiment

[Configuration of Information Processing System]

Figure 1:
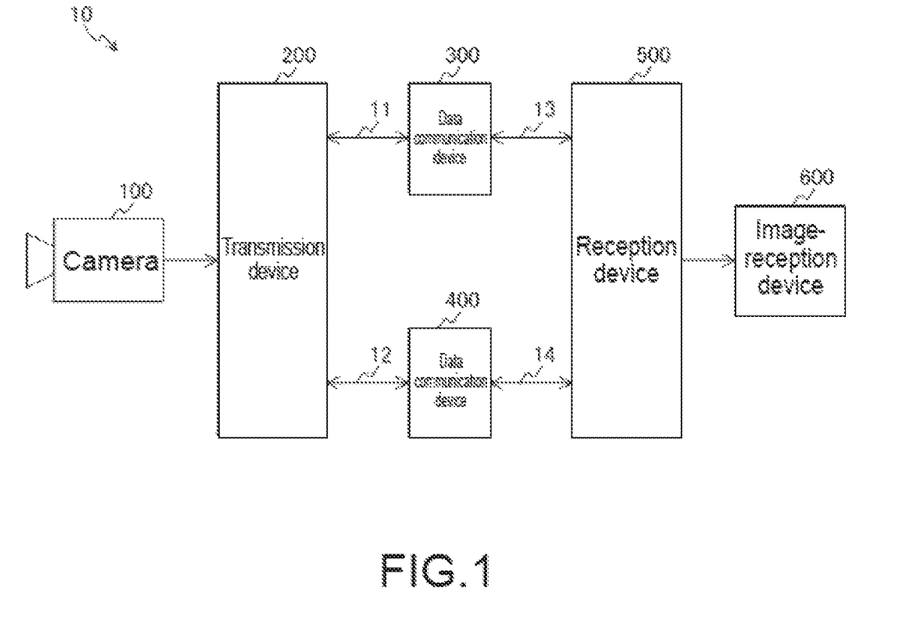
FIG. 1 A diagram showing a configuration example of an information processing system 10 according to embodiments of the present technology.

FIG. 1 is a diagram showing a configuration example of an information processing system 10 according to the embodiments of the present technology. This information processing system 10 includes a camera 100, a transmission device 200, data communication devices 300 and 400, a reception device 500, and an image-reception device 600.

The camera 100 acquires images and voices by performing imaging. For example, cameras that perform imaging for television broadcast correspond to this camera 100.

The transmission device 200 transmits the images and the voices acquired by the camera 100 to the reception device 500. This transmission device 200 transmits the images and the voices via channels that transmit data items via wireless communication. At this time, the transmission device 200 converts the images and the voices to data items such as packets using an IP (Internet Protocol), and transmits these data items. Further, by using LTE as the above-mentioned channel, the data items can be transmitted at high speed. When the transmission device 200 performs multi-link transmission of transmitting the data items by using a plurality of channels, a transfer rate and transfer reliability can be increased. A configuration of the transmission device 200 is described in detail below. Note that, the transmission device 200 is an example of an information processing device described in the claims.

The data communication devices 300 and 400 relay the above-mentioned channels. These data communication devices 300 and 400 are connected to the LTE, and relay the transmission of the data items. As the data communication devices 300 and 400, there may be used a smartphone or an LTE-USB (Universal Serial Bus) dongle. On a premise that the smartphone is used as the data communication device 300, the transmission device 200 and the data communication device 300 are connected to each other via a wireless network 11. Further, the data communication device 300 and the reception device 500 are connected to each other via LTE 13. In this case, the wireless network 11 is connected to the LTE 13 by tethering with the data communication device 300.

Meanwhile, on a premise that the LTE-USB (Universal Serial Bus) dongle is used as the data communication device 400, the transmission device 200 and the data communication device 400 are connected to each other via a USB 12. Further, the data communication device 400 and the reception device 500 are connected to each other via LTE 14. Hereinbelow, a channel constituted by the wireless network 11, the data communication device 300, and the LTE 13 is referred to as a first channel. Further, a channel constituted by the USB 12, the data communication device 400, and the LTE 14 is referred to as a second channel.

The reception device 500 receives the data items transmitted from the transmission device 200. The data items that this reception device 500 receives are data items transmitted via the channels that transmit data items via the wireless communication. The received data items are converted to the images and the voices, and then output to the image-reception device 600. Further, in a case where missing of the transmitted data items occurs, the reception device 500 requests the transmission device 200 to retransmit missing ones of these data items. A configuration of the transmission device 200 is described in detail below. Note that, the reception device 500 is an example of another information processing device described in the claims.

The image-reception device 600 displays the images and outputs the voices, which are output from the reception device 500. An image-reception device for checking the images taken by the camera 100, for example, in a studio, corresponds to this image-reception device 600.

In this way, in the information processing system 10, the plurality of LTEs capable of high-speed transfer are used to transmit images of, for example, moving images. With this, at a time when the images taken by the camera 100 are displayed on the image-reception device 600, these images can be displayed almost in real time. Note that, the configuration of the information processing system is not limited to this example. For example, the data items may be transmitted with use of three or more channels.

[Configuration of Transmission Device]

Figure 2:
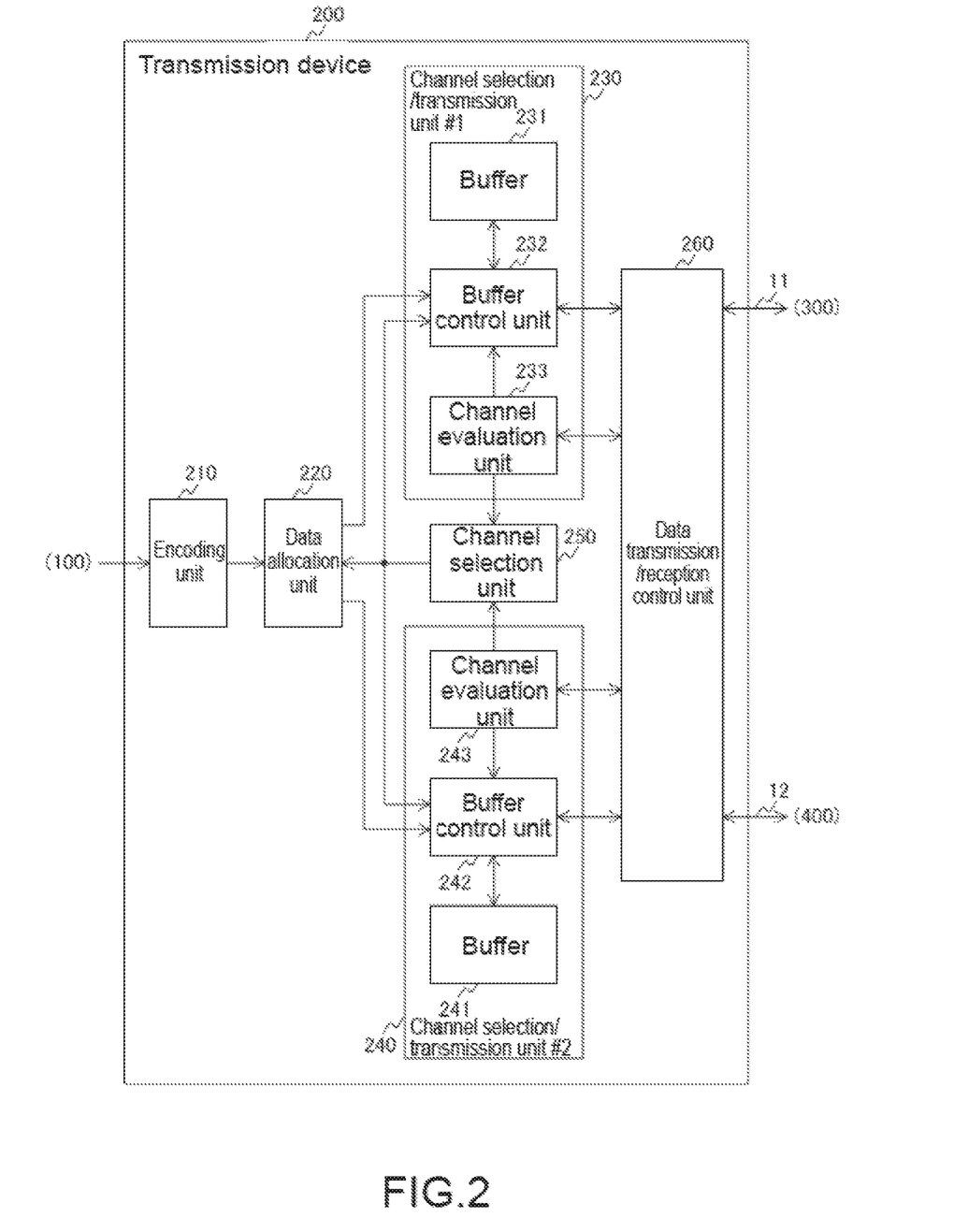
FIG. 2 A diagram showing a configuration example of a transmission device 200 according to the embodiments of the present technology.

FIG. 2 is a diagram showing a configuration example of the transmission device 200 according to the embodiments of the present technology. This transmission device 200 includes an encoding unit 210, a data allocation unit 220, channel selection/transmission units #1 (230) and #2 (240), and a data transmission/reception control unit 260.

The encoding unit 210 encodes the linages and the voices output from the camera 100. The encoding herein refers to the conversion of the images and the like to digital data items. This encoding may be performed by using known methods. At this time, the encoding unit 210 may change an encoding rate on the basis of channel transmission rates output from channel evaluation units 233 and 243 describe below. Further, the encoding unit 210 converts the data items of the encoded images and the like to the packets, and outputs these packets to the data allocation unit 220.

The data allocation unit 220 allocates the packets output from the encoding unit 210 to the channels. This allocation may be performed in accordance with conditions of the channels, such as the transmission rates thereof, specifically, the packets are allocated more to one with a higher transmission rate of the channels. With this, a packet transmission rate of an entirely of the system can be increased. The data allocation unit 220 allocates the packets on the basis of a selection result output from a channel selection unit 250 described below. The allocated packets are output to the channel selection/transmission units #1 (230) and #2 (240) described below. Further, at the time of the allocation, the packets are assigned with a series of numbers such that the packets are mixed in an imaging order in a mixing unit 520 described below.

The channel selection/transmission units #1 (230) and #2 (240) transmit, to the channels, the data items allocated by the data allocation unit 220. The channel selection/transmission units #1 (230) and #2 (240) in FIG. 2 correspond respectively to the first channel and the second channel, and transmit the data items via the data transmission/reception control unit 260 described below. Further, the channel selection/transmission units #1 (230) and #2 (240) evaluate the corresponding channels, and output results of the evaluations to the channel selection unit 250.

Further, the channel selection/transmission units #1 (230) and #2 (240) may transmit the data items to channels other than the corresponding channels. Now, description is made by way of an example of the channel selection/transmission unit #1 (230). For example, in a case where a transmission rate of the first channel decreases, the channel selection/transmission unit #1 (230) may transmit the data items to the second channel. At this time, the channel selection/transmission unit #1 (230) causes the data transmission/reception control unit 260 to designate via which of the channels the data items are transmitted. This designation can be performed by, for example, assigning a flag indicating a channel to each of the data items (packets), and then outputting these data items to the data transmission/reception control unit 260. Further, as described below, the channel selection/transmission units #1 (230) and #2 (240) also transmit and receive control packets. Configurations of the channel selection/transmission units #1 (230) and #2 (240) are described in detail below.

The data transmission/reception control unit 260 controls the transmission and the reception of the data items via the channels connected to the transmission device 200. This data transmission/reception control unit 260 transmits the data items (packets) output from the channel selection/transmission units #1 (230) and #2 (240) to the corresponding channels or the designated channels. Further, this data transmission/reception control unit 260 outputs the data items received via the first channel and the second channel to corresponding ones of the channel selection/transmission units #1 (230) and #2 (240). For example, the control packets transmitted from the reception device 500 correspond to these received data items. Note that, the data transmission/reception control unit 260 is an example of a transmission control unit described in the claims.

The channel selection unit 250 performs selection from the plurality of channels. The selection that the channel selection unit 250 in FIG. 2 performs is selection from the first channel and the second channel. This channel selection unit 250 outputs the results of the selection to the data allocation unit 220 and the channel selection/transmission units #1 (230) and #2 (240). A configuration of the channel selection unit 250 is described in detail below.

[Configurations of Channel Selection/Transmission Units in Transmission Device]

The channel selection/transmission unit #1 (230) in FIG. 2 includes a buffer 231, a buffer control unit 232, and the channel evaluation unit 233.

The buffer 231 temporarily holds the data items (packets) output from the data allocation unit 220.

The buffer control unit 232 controls the buffer 231. Further, this buffer control unit 232 controls an entirety of the channel selection/transmission unit #1 (230). The buffer control unit 232 causes the packets output from the data allocation unit 220 to be held by the buffer 231. Then, the buffer control unit 232 acquires the packets from the buffer 231, and outputs these packets to the data transmission/reception control unit 260. By causing the packets to be held by the buffer 231 once in this way, even in a case the channel changes in condition, for example, the channel decreases in transmission rate, processes on the data items output from the camera 100 can be continued. Further, in a case where failures of the channels occur to cause packet missing, missing packets can be retransmitted.

Further, the buffer control unit 232 acquires a condition of the first channel on the basis of an evaluation value of the first channel, which is output from the channel evaluation unit 233 described below. Then, in the case where the first channel changes in condition, for example, this channel decreases in transmission rate, the buffer control unit 232 transmits the packets to a channel selected by the channel selection unit 250 described below so as to prevent the packets from causing the buffer 231 to reach its capacity. In other words, the buffer control unit 232 transmits the data items held by the buffer 231 to the selected channel in accordance with the number of the data items held by the buffer 231. In this case, the flags for the channel designation as described above are assigned to the data items by the buffer control unit 232, and these data items are output to the data transmission/reception control unit 260.

The channel evaluation unit 233 evaluates the corresponding channel. This channel evaluation unit 233 evaluates the channel on the basis of an evaluation function, and outputs the result of the evaluation to the channel selection unit 250. The evaluation based on the evaluation function can be performed, for example, by using the transmission rate. The channel evaluation unit 233 measures an RTT (Round Trip Time) of the first channel as its transmission rate, and inputs the RTT to the evaluation function. The RTT can be acquired by measuring a period from the transmission of the control packets to the reception of the response packets transmitted from the reception device 500. As the evaluation function that uses the RTT, there may be used a function expressed by the following equation.

$$Fa(i)=1/(RTT(i)*1000+1)$$

in this equation, Fa(i) is the evaluation function. Note that, "i" is an identification number for the channels. Further, RTT(i) is an average value of, for example, 200 ms. By this evaluation function, a high evaluation value is output with respect to a channel with high transmission rate. This channel, which transmits the packets at high speed, can be selected with use of an evaluation result of this evaluation function.

Further, the evaluation based on the evaluation function may be performed, for example, by using an error rate. The error rate herein refers to a probability of occurrence of a transmission error. As this error rate, there may be used, for example, a ratio of the number of the missing packets to the number of the packets transmitted by the transmission device 200. In this case, the error rate is measured by the reception device 500, and transmitted as the control packets to the transmission device 200. The channel evaluation unit 233 is capable of acquiring the error rate from the received control packets. As the evaluation function, there may be used a function similar to Fa(i) mentioned above, specifically, a function of outputting an inverse of a value obtained by multiplying the error rate by a predetermined coefficient. A channel that is used in transmitting the packets with high reliability can be selected with use of an evaluation result of this evaluation function.

Still further, as the evaluation function, there may be used a function of performing an evaluation baaed on both the RTT and the error rate mentioned above. A channel that is used in transmitting the packets at high speed and with high reliability can be selected with use of an evaluation result of this evaluation function. Yet further, there may be used a function of applying weights to both the RTT and the error rate.

Yet further, as the evaluation function, there may be used a function of evaluating information items input from an outside. For example, information items of a channel of the plurality of channels, for which maintenance is scheduled, correspond to the information items input from the outside. In this case, as the evaluation function, there may be used a function of starting to curb an evaluation value of the channel shortly before a time point when the maintenance is scheduled to start. Further, a time zone when the transmission rate decreases due to congestion may be used as the information items input from the outside. In this case, as the evaluation function, there may be used a function of curbing an evaluation value of the channel in the congestion time zone.

The channel selection/transmission unit #2 (240) in FIG. 2 includes a buffer 241, a buffer control unit 242, and the channel evaluation unit 243.

Configurations of these units are the same as those of the buffer 231, the buffer control unit 232, and the channel evaluation unit 233 described above except for the correspondence to the second channel. Thus, description thereof is omitted.

[Configuration of Channel Selection Unit in Transmission Device]

The channel selection unit 250 in FIG. 2 performs the selection from the channels on the basis of the evaluation results output from the channel evaluation units 233 and 234. The result of the selection is output to the data allocation unit 220 and the buffer control units 232 and 242. This channel selection unit 250 is capable of selecting one of the plurality of channels, and outputting the selected one, for example, to the buffer control unit 232. Specifically, the channel selector unit 250 selects one of the first channel and the second channel, and outputs the selected one, for example, to the buffer control unit 232. Further, the channel selection unit 250 may select a plurality of ones of the plurality of channels. Specifically, the channel selection unit 250 may select both the first channel and the second channel, and outputting these channels to the data allocation unit 220. At this time, the channel selection unit 250 outputs evaluation values of the transmission rates of these channels. With this, the data allocation unit 220 can allocate the data items on the basis of the evaluation values of the transmission rates.

[Configuration of Reception Device]

Figure 3:
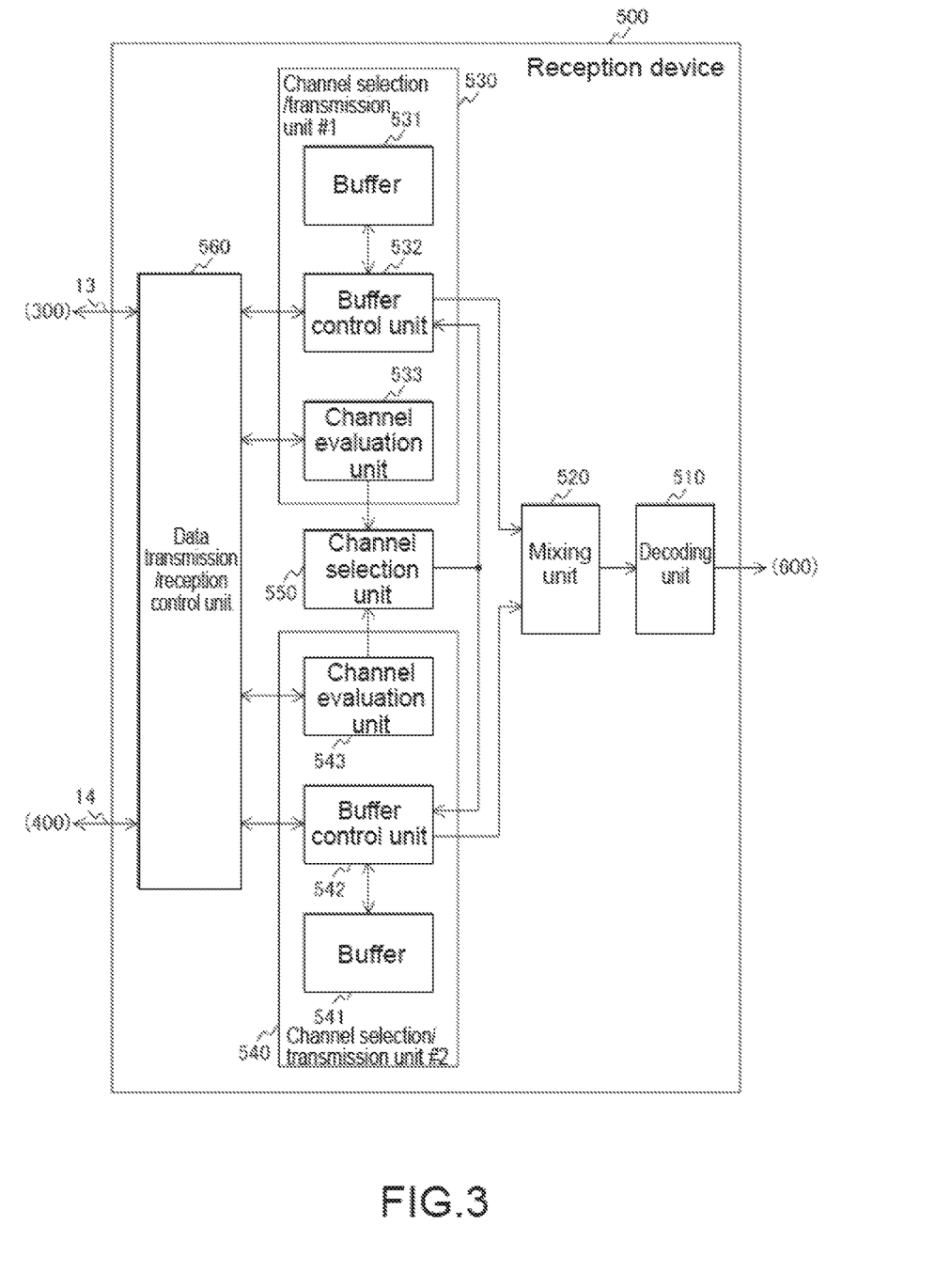
FIG. 3 A diagram showing a configuration example of a reception device 500 according to the embodiments of the present technology.

FIG. 3 is a diagram showing a configuration example of the reception device 500 according to the embodiments of the present technology. This reception device 500 includes a data transmission/reception control unit 560, channel selection/transmission units #1 (530) and #2 (540), a channel selection unit 550, the mixing unit 520, and a decoding unit 510.

Similar to the data transmission/reception control unit 260 described with reference to FIG. 2, the data transmission/reception control unit 560 controls the transmission and the reception of the data items via the channels connected to the transmission device 200. This data transmission/reception control unit 560 outputs the packets received via the first channel to the channel selection/transmission unit #1 (530). Further, the data transmission/reception control unit 560 outputs the packets received via the second channel to the channel selection/transmission unit #2 (540). Note that, the packets to which the channel-designation flags are assigned by the buffer control units 232 and 242 described with reference to FIG. 2 are output to channel selection/transmission units other than the channel selection/transmission units to which the packets without the flags are output, such as the channel selection/transmission unit #1 (530). Specifically, when the flags designating the first channel are assigned to the packets received via the first channel, the data transmission/reception control unit 560 outputs these packets to the channel selection/transmission unit #2 (540). Similarly, when the flags designating the second channel are assigned to the packets received via the second channel, the data transmission/reception control unit 560 outputs these packets to the channel selection/transmission unit #1 (530). In this way, when the packets are transmitted via switched ones of the channels from the transmission device 200, the data transmission/reception control unit 560 outputs these packets to alternative ones of the channel selection/transmission units #1 (530) and #2 (540), which correspond to other ones of the channels before the switching. Further, the data transmission/reception control unit 560 also transmits the control packets.

The channel selection/transmission units #1 (530) and #2 (540) output the packets received via the channels to the mixing unit 520. The channel selection/transmission unit #1 (530) outputs the packets received via the first channel to the mixing unit 520. The channel selection/transmission unit #2 (540) outputs the packets received via the second channel to the mixing unit 520. The channel selection/transmission units #1 (530) and #2 (540) also generate and transmit the control packets. These control packets are transmitted via the above-described data transmission/reception control unit 560. Configurations of the channel selection/transmission units #1 (530) and #2 (540) are described in detail below.

The mixing unit 520 nixes the packets output from each of the channel selection/transmission units #1 (530) and #2 (540). This mixing unit 520 mixes the packets in an order of the numbers assigned by the data allocation unit 220 described with reference to FIG. 2. The mixed packets are output to the decoding unit 510.

The decoding unit 510 decodes the packets output from the mixing unit 520, and converts these packets to the image data items and the audio data items. The image data items and the audio data items after the conversion are data items to be output from the reception device 500.

A configuration of the channel selection unit 550 is the same as that of the channel selection unit 250 described with reference to FIG. 2, and hence description thereof is omitted.

[Configurations of Channel Selection/Transmission Units in Reception Device]

The channel selection/transmission unit #1 (530) in FIG. 3 includes a buffer 531, a buffer control unit 532, and a channel evaluation unit 533.

The buffer 531 temporarily holds the packets output from the data transmission/reception control unit 560.

The buffer control unit 532 controls the buffer 531. Further, this buffer control unit 532 controls an entirety of the channel selection/transmission unit #1 (530). The buffer control unit 532 causes the packets that the data transmission/reception control unit 560 has received via the first channel to be held by the buffer 531. Then, the buffer control unit 532 acquires the packets from the buffer 531, and outputs these packets to the mixing unit 520. By causing the packets to be held once by the buffer 531 in this way, even in a case where missing of the packets occurs during the transmission, an extra period for retransmitting missing packets can be obtained. With this, the output of the images from the reception device 500 can be continued.

In this case, the buffer control unit 532 transmits packets for requesting the retransmission of the missing packets to the transmission device 200. Further, the buffer control unit 532 generates the control packets for the above-described channel evaluation, and transmits these packets to the transmission device 200. In a case of transmitting such data items of high importance, the buffer control unit 532 transmits the packets via a channel selected by the channel selection unit 550.

A configuration of the channel evaluation unit 533 is the same as that of the channel evaluation unit 233 described with reference to FIG. 2, and hence description thereof is omitted.

The channel selection/transmission unit #2 (540) in FIG. 3 includes a buffer 541, a buffer control unit 542, and a channel evaluation unit 543. Configurations of these units are the same as those of the buffer 531, the buffer control unit 532, and the channel evaluation unit 533 described above except for the correspondence to the second channel. Thus, description thereof is omitted.

[Data Transmission]

Figure 4:
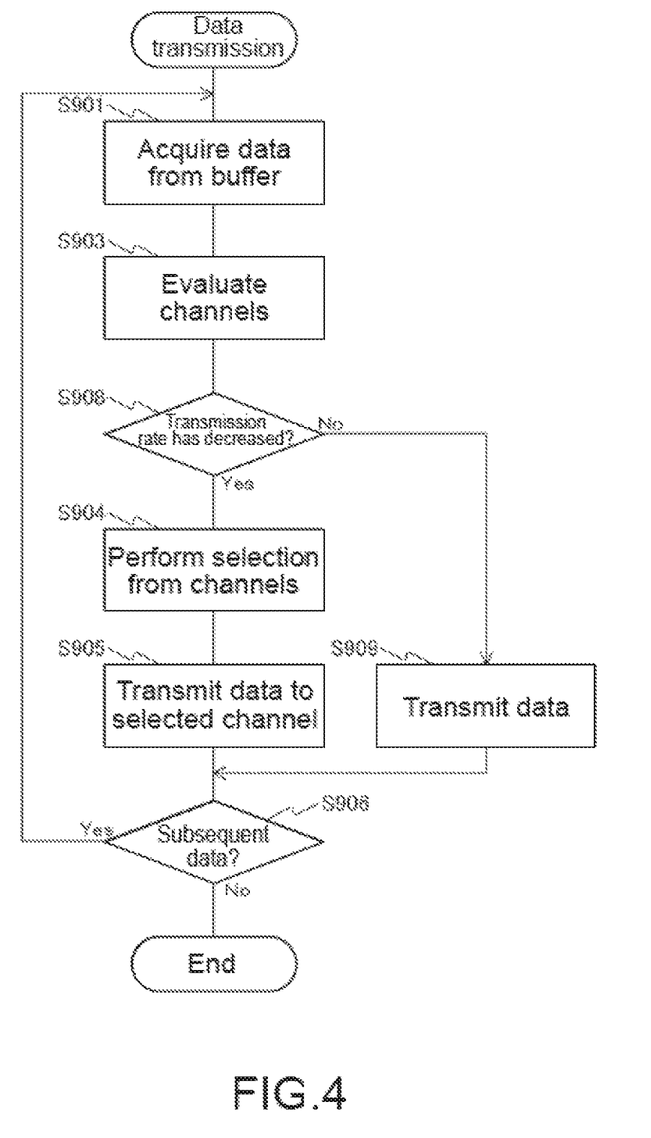
FIG. 4 A flowchart showing an example of a procedure of data transmission processes according to a first embodiment of the present technology.

FIG. 4 is a flowchart showing an example of a procedure of data transmission processes according to the first embodiment of the present technology. The data transmission processes in FIG. 4 are executed in the channel selection/transmission units #1 (230) and #2 (240) of the transmission device 200. Description is made by way of an example of the channel selection/transmission unit #1 (230).

First, the buffer control unit 232 acquires the data items (packets) from the buffer 231 (Step S901). Then, the channel evaluation unit 233 evaluates the first channel (Step S903). Specifically, the channel evaluation unit 233 evaluates the transmission rate of the channel by measuring the RTT thereof. On the basis of the result of this evaluation, the buffer control unit 232 determines whether or not the transmission rate of the channel has decreased (Step S908). In the case where the transmission rate has decreased (Step S908: Yes), the channel selection unit 250 performs the selection from the channels (Step S904). With this, a channel that has not yet decreased in transmission rate is selected. The buffer control unit 232 transmits the data items (packets) held by the buffer 231 to a selected channel (Step S905). Next, the procedure proceeds to a process of step S906.

Meanwhile, in Step S908, when the transmission rate has not decreased (Step S908: No), without the channel switching, the buffer control unit 232 transmits the data items held by the buffer 231 (Step S909). Then, the procedure proceeds to the process of Step S906. In Step S906, the buffer control unit 232 determines whether or not subsequent data items are in the buffer 231 (Step S906). When there are subsequent data items (Step S906: Yes), the buffer control unit 232 re-executes the processes from Step S901. Meanwhile, when there are no subsequent data items, the buffer control unit 232 ends the data transmission procedure.

In this way, in the first embodiment of the present technology, the data items are transmitted to the plurality of channels while evaluating the conditions of the channels, such as the transmission rates thereof. In a case where a transmission rate of one of the channels decreases during the transmission of the data items, another one of the channels, which has not yet decreased in transmission rate, is selected, and the transmission of the data items is continued. With this, even in a case where transmission rates of some of the channels decrease, a decrease in transmission rate of the entirety of the system can be prevented by switching to other ones of the channels.

2. Second Embodiment

In the above-described first embodiment, in the case where the transmission rate of the one of the channels decreases, the other one of the channels, which has not yet decreased in transmission rate, is selected, and the data items are transmitted. The second embodiment of the present technology is different from the above-described first embodiment in that, in the case where the missing of the transmitted data items occurs, the retransmission of these data items is requested, and these data items are retransmitted.

[Data Transmission]

Figure 5:
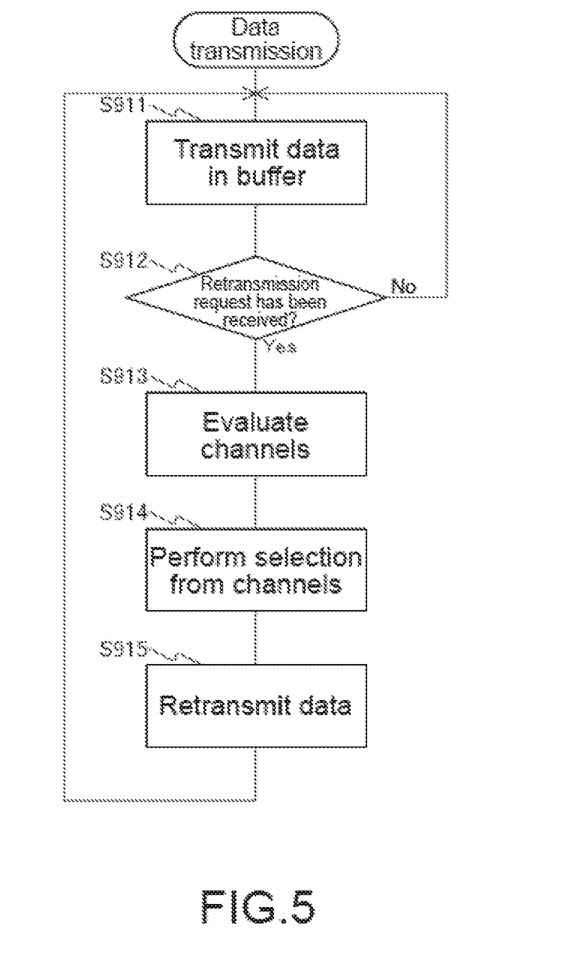
FIG. 5 A flowchart showing an example of a procedure of data transmission processes according to a second embodiment of the present technology.

FIG. 5 is a flowchart showing an example of a procedure of data transmission processes according to the second embodiment of the present technology. The data transmission processes in FIG. 5 are executed in the transmission device 200, which are processes of retransmitting missing data items. Description is made by way of an example of the channel selection/transmission unit #1 (230).

First, the buffer control unit 232 transmits the data items (packets) held by the buffer 231 (Step S911). The processes described with reference to FIG. 4 can be executed as this process. Then, the buffer control unit 232 determines whether or not the retransmission request has been received from the reception device 500 (Step S912). Specifically, the buffer control unit 232 determines whether or not the control packets for requesting the retransmission have been received. When the retransmission request has not been received (Step S912: No), the channel selection/transmission unit #1 (230) returns the procedure to the process of Step S911.

Meanwhile, in a case where the retransmission request has been received (Step S912: Yes), the channel evaluation unit 233 evaluates the one of the channels (Step S913). The packet retransmission needs to be performed at high speed, and hence the channel evaluation unit 233 evaluates the transmission rate of the one of the channels. At this time, the channel evaluation unit 243 also evaluates the transmission rate of the other one of the channels. Then, the channel selection unit 250 performs the selection from the channels (Step S914). The buffer control unit 232 retransmits the data items to a selected channel (Step S915), and the procedure is returned to the process of Step S911.

[Data Reception]

Figure 6:
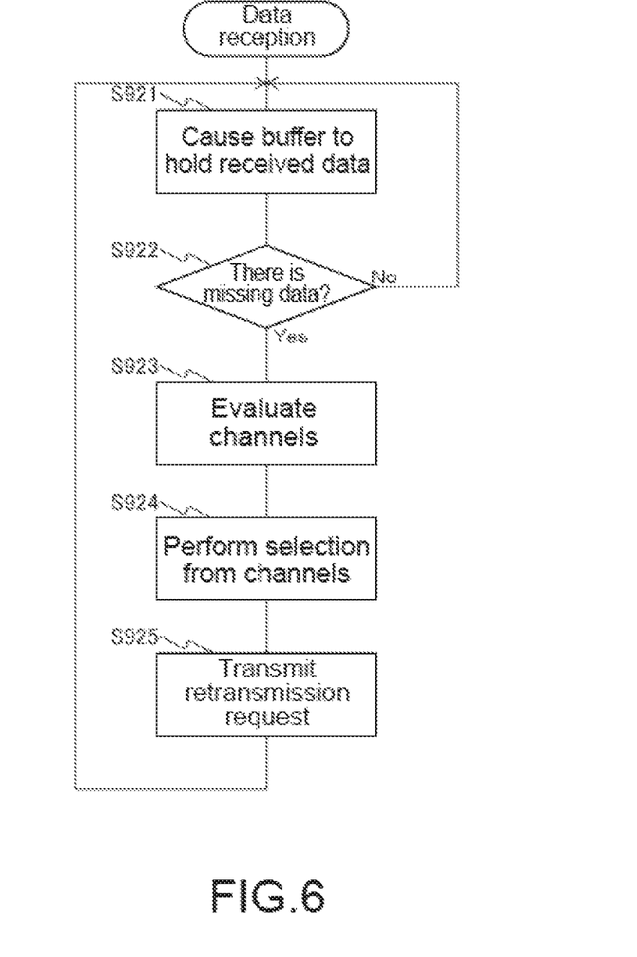
FIG. 6 A flowchart showing an example of a procedure of data reception processes according to the second embodiment of the present technology.

FIG. 6 is a flowchart showing an example of a procedure of data reception processes according to the second embodiment of the present technology. The data reception processes in FIG. 6 are executed, in the reception device 500, which are processes of requesting the retransmission of the missing data items. Description is made by way of an example of the channel selection/transmission unit #1 (530).

First, the buffer control unit 532 causes the buffer 531 to hold the received data items (packets) (Step S921). Then, the buffer control unit 532 determines whether or not there are missing data items (Step S922). This determination can be made by identifying the numbers assigned to the packets held by the buffer 531. When there are no missing data items (Step S922: No), the channel selection/transmission unit #1 (530) returns the procedure to the process of Step S921.

Meanwhile, in the casa where there are missing data items (Step S922: Yes), the channel evaluation unit 533 evaluates the one of the channels (Step S923). In order to avoid transmission errors during the packet retransmission, the channel evaluation unit 533 evaluates the error rate of the one of the channels. At this time, the channel evaluation unit 543 also evaluates the error rate of the other one of the channels. Then, the channel selection unit 550 performs the selection from the channels (Step S924). The buffer control unit 532 transmits the retransmission request for the data items to a selected channel (Step S925). Specifically, the buffer control unit 532 transmits the control packets for requesting the retransmission of the missing data items. Next, the channel selection/transmission unit #1 (530) returns the procedure to the process of step S921.

The second embodiment of the present technology is not limited to the above-described example. For example, a channel with high transmission rate may be selected for transmitting the retransmission request for the missing data items. In this case, the processes of retransmitting the data items can be executed at high speed. Further, the channel selection unit 550 may select the plurality of channels.

Specifically, the channel selection unit 550 may select both the first channel and the second channel, and transmitting the retransmission request for the missing data items to each of the channels. By transmitting the retransmission requests for the missing data items in a multiplexed state, reliability in transmitting the retransmission requests for the missing data items can be further increased.

Other configuration features of the information processing system 10 are the same as those of the information processing system 10 described in the first embodiment of the present technology. Thus, description thereof is omitted.

As described above, in the second embodiment of the present technology, in requesting the retransmission of the missing data items generated during the transmission, and in retransmitting these data items, the channel with high transmission rate or the channel with low error rate is selected for performing the transmission and the reception. With this, reliability and speed in executing the processes of retransmitting the missing data items in the reception device can be increased.

3. Third Embodiment

In the above-described first embodiment, in the case where the transmission rate of one of the channels decreases, another one of the channels, which has not yet decreased in transmission rate, is selected for transmitting the data items. The third embodiment of the present technology is different from the above-described first embodiment in that the plurality of channels are selected for transmitting the data items in a multiplexed state as a precaution against the missing of the data items.

[Data Transmission]

Figure 7:
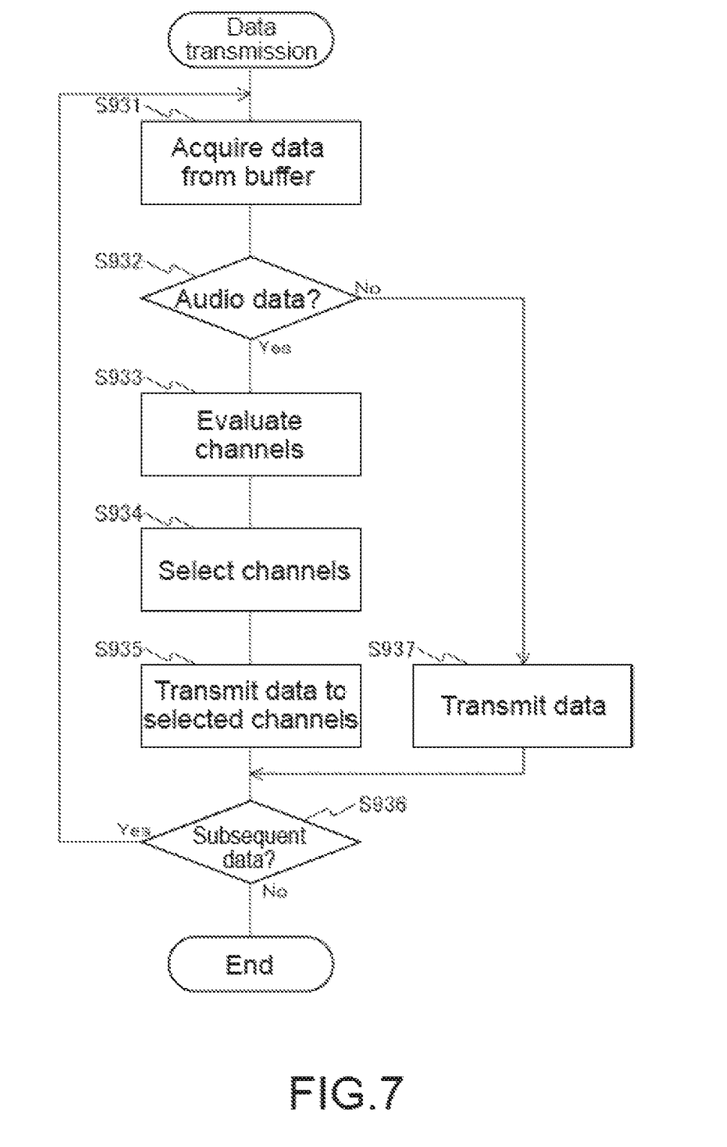
FIG. 7 a flowchart showing an example of a procedure of data transmission processes according to a third embodiment of the present technology.

FIG. 7 is a flowchart showing an example of a procedure of data transmission processes according to the third embodiment of the present technology. The processes in FIG. 7 are executed when the audio data items or the like are transmitted in the multiplexed state. Specifically, the processes are executed to transmit the same audio data items (packets) to each of the first channel and the second channel described with reference to FIG. 2. By transmitting these data items in the multiplexed state, occurrence of the retransmission due to the missing of the data items can be reduced, with this, real-time characteristics of the audio data items or the like can be maintained. Description is made by way of an example of the channel selection/transmission unit #1 (230).

First, the buffer control unit 232 acquires the data items (packets) from the buffer 231 (Step S931). Then, the buffer control unit 232 determines whether or not these packets are audio data items (Step S932). When the packets are audio data items (step S932: Yes), the channel evaluation unit 233 evaluates the first channel (Step S933). Similarly, the channel evaluation unit 243 also evaluates the second channel. Then, the channel selection unit 250 selects the plurality of channels on the basis of the results of the evaluations (Step S934). Specifically, the first channel and the second channel are selected. Next, the buffer control unit 232 transmits the data items (same packets) to each of the selected channels (step S935), and the procedure proceeds to a process of Step S936.

Meanwhile, in Step S932, when the packets are not audio data items (Step S932: No), the buffer control unit 232 transmits the data items to the first channel (Step S937), and the procedure proceeds to the process of Step S936. In Step S936, the buffer control unit 232 determines whether or not subsequent data items are in the buffer 231 (Step S936).

When there are subsequent data items (Step S936: Yes), the buffer control unit 232 re-executes the processes from Step S931. Meanwhile, when there are no subsequent data items, the buffer control unit 232 ends the data transmission procedure.

The third embodiment of the present technology is not limited to the above-described example. For example, the transmission device 200 and the reception device 500 may transmit and receive the data items via three or more channels. Specifically, the transmission device 200 and the reception device 500 may transmit and receive the data items via four channels. In this case, in Step S934 described above, the channel selection unit 250 selects two channels with first and second lowest error rates from the four channels.

Other configuration features of the information processing system 10 are the same as those of the information processing system 10 described in the first embodiment of the present technology. Thus, description thereof is omitted.

As described above, in the third embodiment of the present technology, the plurality of ones of the plurality of channels are selected for transmitting the data items in the multiplexed state. With this, the data items can be transmitted and received while maintaining the real-time characteristics of the audio data items or the like.

Note that, the above-described embodiments are examples of embodying the present technology, and the matters in the embodiments and invention-specifying matters in the claims correspond to each other. Similarly, the invention-specifying matters in the claims and the matters having the same names in the embodiments of the present technology correspond to each other. Note that, the present technology is not limited to the embodiments, and can be embodied by making various modifications to the embodiments without departing from the gist thereof.

Further, the procedures described above in the embodiments may be regarded as methods including the series of steps in these procedures. In addition, the procedures may be regarded as programs for causing a computer to execute the series of steps in these procedures, or as recording media that stores the programs. As these recording media, there may be used, for example, CDs (Compact Discs), MDs (MiniDiscs), DVDs (Digital Versatile Discs), memory cards, or Blu-ray (trademark) Discs.

Note that, in addition to the advantages described herein, which are merely examples and hence are not limited thereto, other advantages may be obtained.

Note that, the present technology may also employ the following configurations.

(1) An information processing device, including:
channel evaluation units that evaluate, on the basis of an evaluation function, a plurality of channels that transmit data items via wireless communication;
a channel selection unit that performs selection from the plurality of channels on the basis of results of the evaluations; and
a transmission control unit that transmits the data items to the plurality of channels subjected to the selection.

(2) The information processing device according to Item (1), in which
the evaluation function on the basis of which the channel evaluation units evaluate the plurality of channels is a function of evaluating at least one of a transmission rate or an error rate.

(3) The information processing device according to Item (1), in which
the evaluation function on the basis of which the channel evaluation units evaluate the plurality of channels is a function of evaluating information items from an outside.

(4) The information processing device according to any one of Items (1) to (3), further including
data holding units that hold the data items, in which
the transmission control unit transmits the data items held by the data holding units to the channels subjected to the selection in accordance with the number of the data items held by the data holding units.

(5) The information processing device according to any one of Items (1) to (4), in which the channel selection unit selects one of the plurality of channels on the basis of the results of the evaluations.

(6) The information processing device according to any one of Items (1) to (4), in which
the channel selection unit selects a plurality of ones of the plurality of channels on the basis of the results of the evaluations, and
the transmission control unit transmits the data items to the plurality of selected ones of the plurality of channels.

(7) The information processing device according to any one of items (1) to (6), in which
in a case where missing of the transmitted data items occurs, the transmission control unit retransmits missing ones of the data items to the channels subjected to the selection.

(8) An information processing device, including:
channel evaluation units that evaluate, on the basis of an evaluation function, a plurality of channels that transmit data items via wireless communication;
a channel selection unit that performs selection from the plurality of channels on the basis of results of the evaluations; and
a reception control unit that
receives the data items transmitted to the plurality of channels, and
transmits, to the plurality of channels subjected to the selection, a retransmission request for missing ones of the data items in a case where missing of the received data items occurs.

(9) An information processing system, including:
a transmission device including
channel evaluation units that evaluate, on the basis of an evaluation function, a plurality of channels that transmit data items via wireless communication,
a channel selection unit that performs selection from the plurality of channels on the basis of results of the evaluations, and
a transmission control unit that transmits the data items to the plurality of channels subjected to the selection; and
a reception device including
a reception control unit that receives the data items transmitted via the plurality of channels.

(10) An information processing method, including:
a channel evaluation step of evaluating, on the basis of an evaluation function, a plurality of channels that transmit data items via wireless communication;
a channel selection step of performing selection from the plurality of channels on the basis of results of the evaluations; and a transmission control step of transmitting the data items to the plurality of channels subjected to the selection.

REFERENCE SIGNS LIST 10 information processing system
11 wireless network
12 USB
13, 14 LTE
100 camera
200 transmission device
210 encoding unit
220 data allocation unit
230, 240, 530, 540 channel selection/transmission unit
231, 241, 531, 541 buffer
232, 242, 532, 542 buffer control unit
233, 243, 533, 543 channel evaluation unit
250, 550 channel selection unit
260, 560 data transmission/reception control unit
300, 400 data communication device
500 reception device
510 decoding unit
520 mixing unit
600 image-reception device

The invention claimed is:

1. An information processing device, comprising:
circuitry configured to
transmit data items to a reception device via a first subset of a plurality of channels, wherein each channel is constituted by a network communication path and a long term evolution (LTE) communication path;
evaluate, on a basis of an evaluation function, the plurality of channels;
perform selection of a second subset of the plurality of channels in response to a determination that a transmission rate of the first subset of the plurality of channels decreases on a basis of results of the evaluations, wherein a transmission rate of the second subset of the plurality of channels has not yet decreased; and
transmit the data items to the reception device via the second subset of the plurality of channels.

2. The information processing device according to claim 1, wherein
the evaluation function is a function of evaluating at least one of a transmission rate or an error rate, wherein
in a case in which the evaluation function is the function of evaluating the transmission rate, the function of evaluating the transmission rate is an inverse of a value based on multiplying a round trip time by a first predetermined coefficient; and
in a case in which the evaluation function is the function of evaluating the error rate, the function of evaluating the error rate is an inverse of a value based on multiplying the error rate by a second predetermined coefficient.

3. The information processing device according to claim 1, wherein
the evaluation function is a function of evaluating information items input from an outside, wherein
the information items input from the outside are first information items of one or more of the plurality of channels for which maintenance is scheduled, or second information items of congestion time zones when the transmission rate decreases.

4. The information processing device according to claim 1, wherein the circuitry is further configured to
hold the data items, wherein
transmit the data items held by the circuitry to the reception device via the second subset of the plurality of channels in accordance with the number of the data items held by the data holding units.

5. The information processing device according to claim 1, wherein
the circuitry is further configured to select one of the plurality of channels on a basis of the results of the evaluations.

6. The information processing device according to claim 1, wherein
the circuitry is further configured to
select at least two of the plurality of channels on a basis of the results of the evaluations, and
transmit the data items to the reception device via said at least two of the plurality of channels.

7. The information processing device according to claim 1, wherein
in a case where missing of the transmitted data items occurs, the circuitry is further configured to retransmit missing ones of the data items to the reception device via the second subset of the plurality of channels.

8. An information processing system, comprising:
a transmission device including
circuitry configured to
transmit data items to a reception device via a first subset of a plurality of channels, wherein each channel is constituted by a network communication path and a long term evolution (LTE) communication path,
evaluate, on a basis of an evaluation function, the plurality of channels,
perform selection of a second subset of the plurality of channels in response to a determination that a transmission rate of the first subset of the plurality of channels decreases on a basis of results of the evaluations, wherein a transmission rate of the second subset of the plurality of channels has not yet decreased, and
transmit the data items to the reception device via the second subset of the plurality of channels; and
the reception device, the reception device including
circuitry configured to receive the data items transmitted via the plurality of channels.

9. An information processing method, comprising:
evaluating, on a basis of an evaluation function, a plurality of channels including a first subset of the plurality of channels via which data items are transmitted, wherein each channel is constituted by a network communication path and a long term evolution (LTE) communication path;
performing selection of a second subset of the plurality of channels in response to a determination that a transmission rate of the first subset of the plurality of channels decreases on a basis of results of the evaluations, wherein a transmission rate of the second subset of the plurality of channels has not yet decreased; and
transmitting the data items to a reception device via the second subset of the plurality of channels.

* * * * *